US005454980A

United States Patent [19]

Schlueter et al.

[11] Patent Number: 5,454,980

[45] Date of Patent: Oct. 3, 1995

[54] METHOD OF MAKING BUBBLE AND FOREIGN PARTICLE FREE ELECTRICALLY CONDUCTIVE POLYURETHANES

[75] Inventors: Edward L. Schlueter, Jr., Rochester; James F. Smith, Ontario, both of N.Y.

[73] Assignee: Xerox Corporation, Stamford, Conn.

[21] Appl. No.: 165,792

[22] Filed: Dec. 13, 1993

[51] Int. Cl.[6] .................... C09D 175/04

[52] U.S. Cl. .................... 252/500; 252/510; 252/511; 252/311; 528/52; 528/56

[58] Field of Search .................... 252/500, 510, 252/511, 311; 528/56, 52

[56] References Cited

U.S. PATENT DOCUMENTS 2,871,227 1/1959 Walter .................... 260/77.5
3,931,090 1/1976 Amatangelo .................... 260/23.7 M
3,959,574 5/1976 Seanor et al. .................... 428/425
4,016,130 4/1977 Antczak .................... 260/37 N
4,101,473 7/1978 Lander .................... 260/13
4,116,894 9/1978 Lentz et al. .................... 521/94
4,279,757 7/1981 DeBeuckelaer et al. .................... 210/671
4,314,006 2/1982 Lentz et al. .................... 428/494
4,532,316 7/1985 Henn .................... 528/59
4,692,470 9/1987 Bauman et al. .................... 521/55
4,739,027 4/1988 Mendelsohn et al. .................... 528/60
4,968,383 11/1990 Volkmann et al. .................... 156/643
5,047,494 9/1991 Lin et al. .................... 528/74
5,142,016 8/1992 Sharf et al. .................... 528/60
5,259,989 11/1993 Schlueter, Jr. et al. .................... 252/500
5,259,990 11/1993 Schlueter, Jr. et al. .................... 252/500

*Primary Examiner*—Paul Lieberman
*Assistant Examiner*—Wyatt B. Pratt

[57] ABSTRACT

A method of making an electrically conductive polyurethane elastomer that is substantially free of bubbles and foreign particles comprising:

forming a prepolymer of a polylol and an isocyanate, forming a liquid mixture of an ionic conductive additive, an amount of cross linking agent and chain extenders sufficient to provide a crosslinked elastomer;

filtering the liquid mixture of additive, crosslinking agents and chain extenders to remove foreign particles;

preheating the liquid mixture to a temperature above the decomposition temperature of the additive, crosslinking agents and chain extenders in a degassing oven to degass to less than 5 mm of mercury to break any bubbles in the mixture and remove moisture;

to a vacuum reactor mixer having two input ports add the prepolymer, the preheated degassed liquid mixture and mix under vacuum of less than 5 mm of mercury of a period of time to provide a uniform mixture:

removing the mixture from the vacuum reactor mixer and form into the desired shape, cure the formed shape to an elastomer substantially free of bubbles and foreign particles.

20 Claims, 1 Drawing Sheet

METHOD OF MAKING BUBBLE AND FOREIGN PARTICLE FREE ELECTRICALLY CONDUCTIVE POLYURETHANES

CROSS REFERENCE TO RELATED APPLICATIONS

Attention is directed to U.S. application Ser. No. 08/037,144 entitled "Electrically Conductive Elastomer" in the name of Schlueter et al. and U.S. application Ser. No. 08/037,145 entitled "Electrically Conductive Polyurethane Elastomer" also in the name of Schlueter et al.

BACKGROUND OF THE INVENTION

The present invention relates to a method of making an electrically conductive polyurethane elastomer, and in particular, to one which is substantially free of bubbles and foreign particles. It has particular application as a bias transfer member in transferring toner from an electrostatographic imaging surface to a receiving surface such as a sheet of paper. It has additional application as a conductive intermediate transfer belt or as a transport member.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a developer material is transported into contact with the electrostatic latent image. Toner particles are attracted from the carrier granules of the developer material onto the latent image. The resultant toner powder image is then transferred from the photoconductive surface to a sheet of support material and permanently affixed thereto.

This process is well known and useful for light lens copying from an original and in printing applications from electronically generated or stored originals.

In a reproduction process of the type as described above, it is common practice today to use a biased transfer member to transfer the developed image from the photoconductor to the final support material such as a sheet of paper. Typically, these biased transfer members take the form of a roll and are comprised of a polyester based polyurethane with an additive to control resistivity such as tetraheptyl ammonium bromide.

U.S. Pat. No. 3,959,574 to Seanor et al. describes additional quarternary ammonium compounds for controlling the resistivity of the elastomeric polyurethanes. The above two cross referenced copending applications describe polyether based polyurethanes containing an asymmetric ionic quarternary ammonium salt which has an extended useful electrical life. The transport belts which may be useful in the practice of the present invention may be similar to those described in U.S. Pat. No. 3,931,090 to Amatangelo and in U.S. Pat. No. 4,314,006 to Lentz et al.

While capable of performing satisfactorily certain difficulties do appear in the manufacture of the rolls and belts. In particular, undissolved particles frequently appear in the polyurethane which causes an imperfection in the urethane which in addition to resulting in nonuniform resistivity also leads to poor transfer properties and poor mechanical strength. Furthermore, bubbles appear in the conductive polyurethane, some of which can only be seen with the aid of a microscope, others of which are large enough to be observed with the naked eye. These bubbles provide the same kind of difficulty as the undissolved particles in the polyurethane namely, poor or nonuniform electrical properties, poor mechanical properties such as durometer, tensile strength, elongation, a decrease in the modulus and a decrease in the toughness of the material.

SUMMARY OF THE INVENTION

In accordance with the principle aspect of the present invention, a new method of making an electrically conductive polyurethane elastomer that is substantially free of bubbles and foreign particles is provided. More specifically, the present invention is directed to a method of making a bias transfer roll or belt such as an intermediate transfer belt or transport belt which has more uniform electrical properties including resistivity as well as more stable mechanical properties such as mechanical strength, durometer, tensile strength, elongation and toughness as a result of the omission of substantially all foreign particles and bubbles in the polyurethane.

In a further specific aspect of the present invention the method of manufacture comprises forming a prepolymer of a polyol and a isocyanate, forming a liquid mixture of an ionic conductive additive and amounts of cross linking agents and chain extenders sufficient to provide a cross linked elastomer, filtering the liquid mixture of the additive cross linking agents and chain extenders and additive to remove foreign particles, preheating the liquid mixture to a temperature above the melting point but below the decomposition temperature of the additive, the cross linking agents and the chain extenders in a degassing oven to degass to less than 5 millimeters of mercury to break any bubbles in the mixture and remove moisture, adding the preheated liquid mixture to a vacuum reactor mixer having two input ports and mixing with a prepolymer under vacuum of less than 5 millimeters of mercury and preferably 0.5 to about 1.3 millimeters of mercury for a period of time to provide a uniform mixture, removing the mixture from the vacuum reactor mixture and forming it into the desired shape and curing to an elastomer substantially free of bubbles and foreign particles.

In a further aspect of the present invention the prepolymer is preheated and degassed to less than 5 millimeters of mercury prior to adding to the vacuum reactor mixer.

In a further aspect of the present invention the ionic additive cross linking agents and chain extenders are heated to form the liquid mixture.

In a further aspect of the present invention the ionic conductive additive is a quarternary ammonium salt present in the final composition in an amount to provide a D.C. volume resistivity of from about $10^7$ to about $10^{11}$ ohm cm.

In a further aspect of the present invention the quarternary ammonium salt is present in an amount of from about 0.5 parts to 8 parts by weight of the total composition and is selected from the group consisting of tetraheptyl ammonium bromide, trimethyl octadecyl ammonium chloride, benzyl trimethyl ammonium chloride; those asymmetric ionic quarternary ammonium salts having the formula:

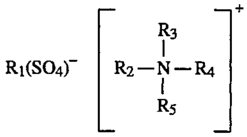

where $R_1$, $R_2$, $R_3$, $R_4$ and $R_5$ are $C_n H_{2n+1}$+and 1<n<25 sufficient to provide a D.C. volume resistivity of from about $10^7$ to about $10^{11}$ ohm cm. and those asymmetric ionic quarternary ammonium salts having the formula:

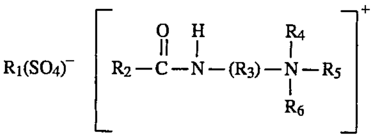

where $R_1$, $R_2$, $R_3$, $R_4$, $R_5$ and $R_6$ are $C_n H_{2n+1}$ and 1<n<25 sufficient to provide a resistivity of from about $10^7$ to about $10^{11}$ ohm cm.

In accordance with another aspect of the present invention the ionic conductive additive is selected from the group consisting of tetraheptyl ammonium bromide, hexadecyl ethyl dimethyl ammonium ethyl sulfate; 1-Octadecanaminium, N,N,N-trimethyl-,methyl sulfate; 1-dodecanammonium N,N,N-trimethyl-, methyl sulfate; 1-heptadecanammonium N,N,N, trimethyl-, methyl sulfate; 1-tetradecanammonium N,N,N-trimethyl-, methyl sulfate; and 1-decanammonium N,N,N-trimethyl-, methyl sulfate; and (3-lauramidopropyl) trimethyl ammonium methyl sulfate.

In the further aspect of the present invention the polyol is a polytetramethylene ether glycol having the formula: $HO[(CH_2)_4O]_x$ where x is from 8 to 41 and said isocyanate is a diisocyanate present in an amount of from about 20 to 95 parts by weight per 100 parts by weight of said glycol.

In a further aspect of the present invention said diisocyanate is present in an amount from about 22 to 26 parts by weight per 100 parts by weight of said glycol.

In a further aspect of the present invention said quarternary ammonium salt is initially combined with the chain extenders and cross linking agents and subsequently added to the prepolymer.

In a further aspect of the present invention said asymmetric ionic quarternary ammonium salt is hexadecyl ethyl dimethyl ammonium ethyl sulfate.

In a further aspect of the present invention said diisocyanate is selected from the group consisting of methylene diisocyanates, diphenylmethane diisocyanates, toluene diisocyanates, naphthalene diisocyanates and blends thereof.

In a further aspect of the present Invention said chain extender and cross linking agent comprise a mixture of from about 90 to 60% by weight of a diol having the formula $HO(R_7)$ OH where $R_7$ is a straight or branched chain alkyl group having from 2 to 12 carbon atoms and from about 10 to 40% of a triol having the formula: R'—C—$[(OH)_a(CH_2OH)]_b$ where R' is H, $CH_3$ or $C_2H_5$, a is 0 or 1, b is 2 or 3 and a+b=3.

For a brief better understanding as well as other objects and further features thereof reference is made to the following drawings and descriptions.

DESCRIPTION OF PREFERRED EMBODIMENT

An electrically conductive polyurethane elastomer substantially free of bubbles and foreign particles and which has particular utility as a bias transfer roll in electrostatographic imaging apparatus or as an intermediate transfer roll or transport roll is prepared by forming a prepolymer of a polyol and an isocyanate then forming a liquid mixture of an ionic conductive additive, an amount of cross linking agent and chain extender sufficient to provide a cross linked elastomer, filtering the liquid mixture of the additive cross linking agent and chain extender and additive to remove foreign particles, preheating the liquid mixture to a temperature above the melting temperature and below the decomposition temperature of the additive, cross linking agents and .chain extenders to degass to less than 5 millimeters to break any bubbles in the mixture and remove moisture. The mixture is then introduced to a preheated vacuum reactor mixer having two input ports and mixed under vacuum of less than 5 millimeters of mercury for a period of time to provide the uniform mixture after which the mixture is removed from the vacuum reactor mixer formed into the desired shape and cured. In a preferred embodiment the prepolymer is also preheated and degassed to less than 5 millimeters of mercury prior to adding to the vacuum reactor mixer.

Figure 1:
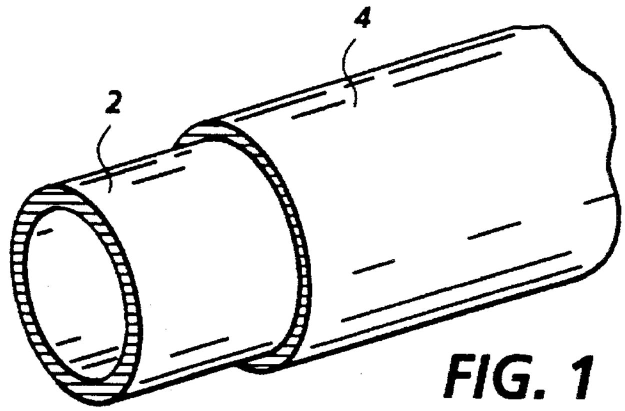
FIG. 1 is a perspective view in partial section showing the construction of a bias transfer roll having an electrically conductive polyurethane elastomer coated upon a conductive substrate according to the practice of the present invention.
Figure 2:
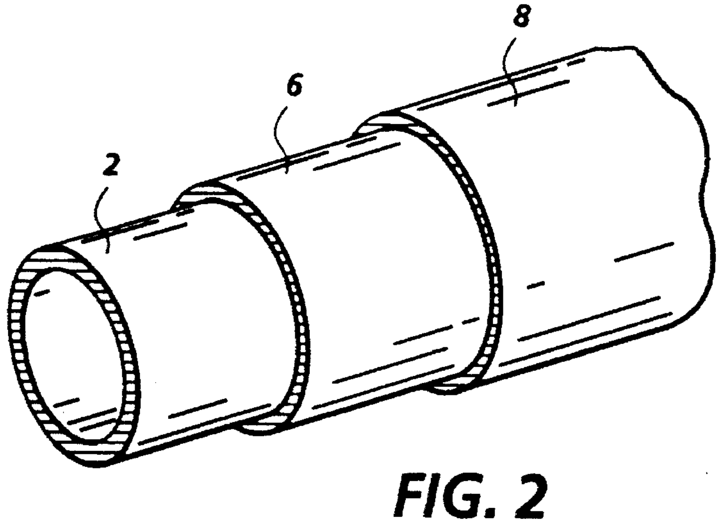
FIG. 2 is a perspective view in partial section showing the construction of a bias transfer roll having an elastomeric resilient blanket or relaxable layer intermediate the conductive substrate and the electrically conductive polyurethane elastomer coated thereon according to the practice of the present invention.
Figure 3:
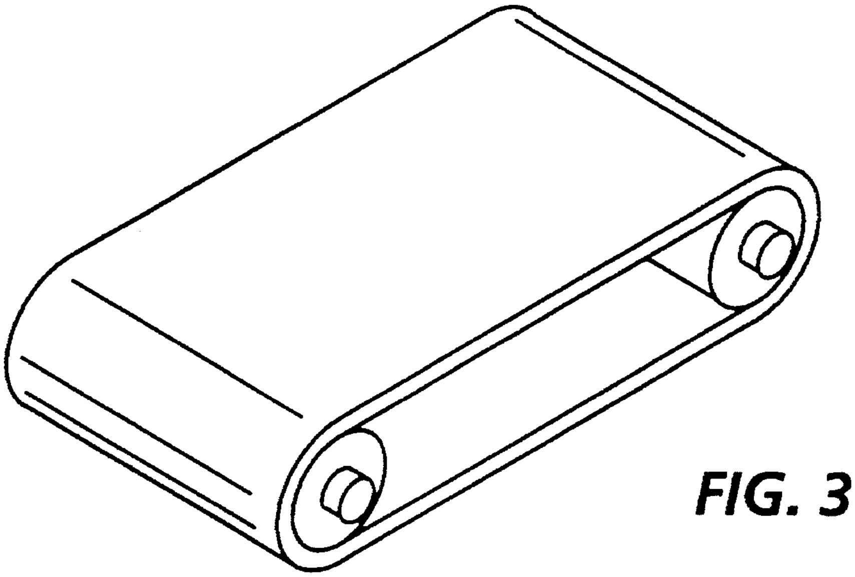
FIG. 3 is an isometric view of an intermediate transfer belt or transport belt made according to the practice of the present invention.

Referring now specifically to FIG. 1, there is shown a cut-away view of a transfer member clearly illustrating the internal construction thereof. The transfer member is in the form of a roll and is basically formed upon a rigid hollow cylinder 2 that is fabricated of a conductive metal, such as aluminum, copper or the like, capable of readily responding to a biasing potential placed thereon. Over core 2 is placed a coating 4 which is an electrically conductive polyurethane elastomer with an additive according to the present invention to render the elastomer conductive and to extend the rolls' useful life. The outer coating 4 which is formed of the resilient elastomeric material is from about 0.001 inch to about 0.250 inch in thickness having a hardness between about 60 Shore A durometer to about 95 Shore A and preferably about 85–95 when the thickness is less than 0.100 inch and 65 to 75 Shore A when the thickness is greater than 0.100 inch. The coating 4 minimizes ionization of the atmosphere in and about the contact region of the bias transfer member with the photoconductor. It is preferred that the resilient elastomeric polyurethane have a D.C. volume resistivity of between about $10^7$ and 5.0×10 ohm cm which is reached or controlled by adding the additive to the polyurethane. In accordance with the present invention, the coating of the conductive substrate must be formulated of at least one layer of an elastomeric polyurethane having as an additive, a compound capable of altering the resistivity to within the preferred resistivity range. By coating the biasable transfer member (roll) with the conductive elastomer, according to the present invention, the resistivity of the biasable transfer roll is controlled and the sensitivity of the resistivity of the biasable transfer roll is also controlled in relationship to changes in relative humidity. FIG. 2 illustrates a bias transfer roll having a resilient blanket or relaxable layer intermediate the conductive substrate 2 and the electrically conductive polyurethane elastomer layer 8 coated thereon according to the practice of the present invention.

Polyurethane elastomers are typically produced by the reaction of a polyisocyanate and a polyether containing hydroxyl groups according to the general reaction:

$$R_aNCO+R_bOH \rightarrow R_aNHCOOR_b$$

In the practice of the present invention the polyurethane elastomer is made by the reaction of a polytetramethylene ether glycol forming the base polymer chain which has the formula $HO[(CH_2)_4O]_xH$ wherein x is from about 8 to about 41 providing a molecular weight range of the order of from 650 to 2,900. In a preferred embodiment, wherein the overall mechanical properties including resiliency, hardness, compression set as well as toughness are relatively stable over a range of temperature and relative humidity distributions normally encountered in an office environment, x is between 39 and 41. Within this higher range of molecular weights of the glycol a relatively soft segment is provided in the polyurethane elastomer enabling a high level of resiliency over a relatively broad temperature range. The preferred polytetramethylene ether glycols are those having molecular weights near the higher end of the stated range and in particular the polyether glycol Terathane™ 2900 available from E. I. DuPont deNemours, Inc. which has a molecular weight of about 2900.

The diisocyanate is selected from the group consisting of methylene diisocyanates, diphenylmethane diisocyanates, toluene diisocyanates, naphthalene diisocyanates and blends thereof and is used in amounts of from about 20 to about 95 parts by weight per 100 parts by weight of the glycol. The functional NCO groups of the diisocyanate provide a relatively hard and rigid segment in the final polymer chain and act very much like a filler to provide a tough but flexible structure that has both hard and soft domains. Typical diisocyanates useful in the practice of the present invention include 4,4'diphenylmethane diisocyanate, 2,4' diphenylmethane diisocyanate, 2,4-toluene diisocyanate, 2,6-toluene diisocyanate and naphthalene 1,5-diisocyanate as well as blends and mixtures thereof. A particularly preferred blend of diisocyanates is one containing 98 percent 4,4' diphenylmethane diisocyanate and 2 percent 2,4' diphenylmethane diisocyanate available under the designation Ioscyanate™ 125M from Dow Chemical Company, Midland, Mich.

In a preferred embodiment, with the preferred higher molecular weight glycols, the diisocyanate or blend thereof is present in an amount of from about 22 to 26 parts by weight per 100 parts by weight of the glycol to provide the stoichiometric amount for the reaction to go to completion.

The optimization of the mechanical properties, and in particular, the achievement of high wear resistance with low compression set is attained by the selection of the type and amounts of chain extenders and cross linking agents. Both bifunctional chain extenders and trifunctional cross linking agents are used in the practice of the present invention in a weight ratio of from about 90% to 60%, to 10% to 40% of bifunctional to trifunctional agents with the higher ratio being used with the lower molecular weight glycols. The bifunctional agents have been found to provide a higher toughness, provide more chain extension in that they tend to nearly link the chain thereby providing a long, generally flexible glycol chain interrupted by the rigid isocyanate units. The trifunctional crosslinkers tend to provide two ends of functionality as well as a 90 degree oriented functional member which crosslinks to other chains prohibiting the chains to slide by each other and thereby minimizing the compression set and tensile set properties as well as the mobility of the additive through the elastomer. Accordingly, the appropriate bonds between hard and soft sites in the polyurethane elastomer are obtained by selecting the bifunctional chain extenders and trifunctional cross linking agents in the appropriate ratio. Typically, the bifunctional chain extenders take the formula $HO(R_6)OH$ where $R_6$ is a straight or branched chain alkyl group having from 2 to 12 carbon atoms and the trifunctional cross linking agents are taken from the formula: $R'—C[(OH)_a(CH_2OH)_b]$ where R' is H, $CH_3$ or $C_2H_5$, a is 0 or 1, b is 2 or 3 and a+b=3. Typical bifunctional diols include ethylene glycol, 1,4 butanediol, 1,3 butanediol 1,6 hexanediol and neopentyl glycol and typical trifunctional triols include trimethylolpropane, trimethylolethane and glycerol. Particularly, preferred bifunctional cross linking agents include 1,4 butanediol, 1,6 hexanediol and 1,3 butanediol because they extend the polymer chain linearly yielding tough wear resistant materials. The particularly preferred trifunctional cross linking agents include trimethylolpropane and trimethylolethane because they cross link the polymer chains at 900 and yield very set resistant networks The bifunctional butanediol acts as a chain extender to extend the chain in the linear way to provide linear soft sites thereby providing the greatest toughness in the final elastomer. On the other hand, the trifunctional trimethylolpropane provides the best compression set performance because it is trifunctional and provides crosslink exchange sites to tighten up the network, thereby providing a crosslinked, three-dimensional network. An amount of combined agents is used to provide a satisfactorily cross linked elastomer. Typically, the total amount of combined extenders and cross linking agents is from about 4 to about 18 parts per 100 parts of the polytetramethylene ether glycol depending on the molecular weight of the glycol with more agents being used with lower molecular weight glycols. In the preferred embodiment with glycols having high molecular weight of the order 2900 and smaller amounts of the diisocyanate of the order of about 22 to 26 parts by weight per 100 parts of the glycol only about 4 to 6 parts by weight of extenders and cross linking agents is necessary because of the long glycol chain length with limited number of functional groups.

While the above discussion relates to the formation of polyether based polyurethanes it should be noted that the practice of the present invention also relates to the polyester based polyurethanes.

A variety of quarternary ammonium compounds may be used in controlling the resistivity of polyurethane elastomers. For example, those materials described in U.S. Pat. No. 3,959,574 to Seanor et al. include tetraheptyl ammonium bromide, trimethyloctadecylammonium chloride, benzyltrimethylammonium chloride, and the like. Generally, most of the reaction products of the tertiary amines with alkyl halides may be used in accordance with the present invention. Typically, these halogenated ammonium compounds are more compatible with polyester based polyurethane compounds.

Polyelectrolytes, such as, salts of acrylic acid, acrylic acid copolymers and sulfonated polystyrene and the like may also be incorporated in the elastomeric polyurethanes as additives to control the resistivity in accordance with the present invention. Examples of inorganic salts which may be used as additives to control the resistivity of the elastomeric polyurethanes are lithium iodide, lithium thiocyanate, sodium chloride, potassium chloride, cuprous chloride and the like.

Plasticizers can also be used to control the resistivity of the elastomeric polyurethanes as well as the control of the resistivity. Examples of suitable plasticizers include dioctylphthalate, tricresyl phosphate, chlorinated polyphenyls, triphenyl phosphate, hexamethylphosphoramide and Methyl toluene sulfonamide and the like. Inorganic pigments, such as barium titanate, asbestos, cadmium sulfide, and cadmium sulfocyanide and the like are also effective as resistivity control agents in accordance with the present invention.

Metallic particles such as copper, silver, nickel and the like may be incorporated in the polyurethanes in accordance with the present invention to control resistivity.

Examples of other additives used to control resistivity in accordance with the present invention are the charge transfer complexes. These may include, for example, morpholinium tetracyanoquinodimethane, tetracyanoquinodimethane, chloranil dimethyl aniline and the like.

Other ionic quaternary ammonium additives that may be useful in the practice of the present invention are the asymmetric salts described in the aforementioned copending applications. These include ionic salts having the formula:

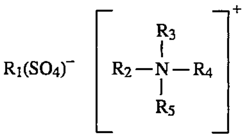

where $R_1$, $R_2$, $R_3$, $R_4$ and $R_5$ are $C_n H_{2n+1}$ and 1<n<25. While $R_1$, $R_2$, $R_3$, $R_4$ and $R_5$ can be the same it is preferred that they all not be the same but rather that they be as different as possible to cause the greatest asymmetry and therefore low additive mobility leading to the longest electrical life. Typical asymmetric ionic quaternary ammonium salts useful in the practice of the present invention include, among others, Hexadecyl ethyl dimethyl ammonium ethyl sulfate, ($C_2O\ H_{44}N.C_2H_5O_4S$); 1-octadecanammonium N, N, N-trimethyl-,methyl sulfate ($C_{21}H_{46}N.CH_3O_4S$); 1-dodecanammonium, N, N, N-trimethyl-, methyl sulfate ($C_{15}H_{34}N.CH_3O_4S$); 1-heptadecanammonium, N, N, N-trimethyl-, methyl sulfate ($C_{20}H_{44}N.CH_3O_4S$); 1-tetradecanammonium, N, N, N-trimethyl-, methyl sulfate ($C_{17}H_{38}N.CH_3O_4S$); and 1-decanammonium, N, N, N-trimethyl-, methyl sulfate ($C_{13}H_{30}N.CH_3O_4S$). Hexadecyl ethyl dimethyl ammonium ethyl sulfate is particularly preferred since it provides an outstanding improvement in electrical life over prior art practices.

Also, the ionic quaternary ammonium salt having the formula:

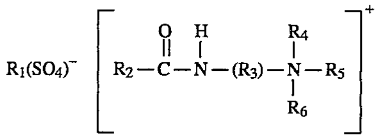

where $R_1$, $R_2$, $R_3$, $R_4$, $R_5$ and $R_6$ are $C_nH_{2n+1}$ and 1<n<25. While $R_1$, $R_2$, $R_3$, $R_4$, $R_5$ and $R_6$ can be the same it is preferred that they all not be the same but rather that they be as different as possible to cause the greatest asymmetry and therefore low additive mobility leading to the longest electrical life. The sulfate anion is preferred because it provides superior cross linking when compared to other an ions such as the halogens and the cation is selected for its high degree of asymmetry and its chemical stability. Typical asymmetric ionic quaternary ammonium salts useful in the practice of the present invention include, among others, (3-lauramidopropyl) trimethyl ammonium methyl sulfate ($C_{18}H_{39}N_2O.CH_3O_4S$ and Trimethyl (3-stearamidopropyl) ammonium methyl sulfate ($C_{24}H_{51}N_2O.CH_3O_4S$). The (3-lauramidopropyl) trimethyl ammonium methyl sulfate is particularly preferred since it provides an outstanding improvement in electrical life for a very broad molecular weight range of polyurethanes. Furthermore, it has a higher decomposition temperature and can therefore be used with high exotherm materials such as the lower molecular weight glycols. The higher decomposition temperature also allows more latitude in selecting the base polymer system and more stability to the lower exotherm materials. This means that there is minimal variation in conductivity providing increased stability and manufacturing latitude.

The salts typically are present in the cured elastomer in an amount sufficient to provide a D.C. volume resistivity of from about $10^7$ to about $10^{11}$ ohm cm. Typically, the quarternary ammonium salt is present in an amount of from about 0.5 parts to 8 parts by weight of the total composition: As the amount of conductive additive increases, the resistivity of the elastomer decreases. The resistivity is influenced more pronouncedly with the addition of the conductive additive in the higher molecular weight materials than in the lower molecular weight materials. This is believed to be due to a greater cross link density and less chain rotation in the lower molecular weight case. This restricts the mobility of the conductive additive thus giving less of a change in resistivity in the lower molecular weight cases.

A catalyst is typically used to speed up the rate of reaction of the crosslinking and extending mechanisms to provide the cured polyurethane elastomers. Typical conventional catalysts include dibutyl tin dilaurate, stannous octoate in a 1% to 2% solution of the diol extender.

The unique practice of the present invention, wherein an electrically conductive polyurethane elastomer is obtained which is substantially free of bubbles and foreign particles is a combination of a number of set steps, some of which uniquely contribute to the elastomer being substantially free of bubbles and foreign particles. Initially, two separate mixtures are prepared and processed separately. A prepolymer is prepared of at least a portion of the glycol with at least a portion of the diisocyanate to enable the reaction of the NCO groups of the isocyanate with OH groups of the glycol to form a long chain so that the NCO groups can't subsequently take up water. This results in a prepolymer that is substantially more stable and less influenced by changing relative humidity. It also yields more predictable electrical and mechanical properties. Typically, this prepolymer has from about 6 to 12% and preferably 9 to 10% by weight of excess NCO. In a preferred embodiment the prepolymer of the glycol and the diisocyanate is preheated and degassed to less than 5 millimeters of mercury and preferably 0.5 to about 1.3 millimeters of mercury prior to being added to the vacuum reactor mixer.

The second mixture includes the cross linkers, chain extenders and ionic conductive additive, which are mixed together and treated in a suitable manner to form a liquid mixture. Typically, this involves heating the material such as, for example, trimethylol propane to 70 to 80 degrees Centigrade for 15 to 30 minutes before being mixed with the chain extender butanediol, which is a liquid at room temperature. In addition, some of the ionic conductive additives may also be solids or powders at room temperature. If the mixture of the conductive ionic additive, cross linking agents and chain extenders does not melt when heated to 70 to 80 degrees Centigrade, it may be subjected to a degass up to about 5 mm of mercury which will break up any hard to melt particles. Residual contaminants are further removed from the mixture by filtering through a 280 to 400 micron mesh screen. When the liquid mixture has been formed it is mixed with a stirrer or spatula or the like to provide a more uniform mixture. Subsequently, the mixture of the ionic conductive additive, cross linking agent and chain extenders is preheated to a temperature below the decomposition temperature and above the melting temperature of the additive, cross linking agents and chain extenders typically 70° to 80° C. and then degassed to less than 5 millimeters of mercury and preferably 0.5 to 1.3 millimeters of mercury to break any bubbles in the mixture and remove moisture for 15 to 30 minutes to remove all the water.

Following the preheating and degassing of the prepolymer and other mixture, they are then added separately to a vacuum reactor mixer, Pyles model #2601-677. The materials are then separately degassed further to remove air and water. The materials are also heated in separate tanks and lines to 70°–90° C. After the material has been degassed and heated the vacuum is removed and 15–30 psi of nitrogen pressure is applied to assist in the pumping action of the liquid delivery to the mixing head. The prepolymer and other mixture are accurately delivered to the mixing head by adjusting the RPM speeds on the mixing pumps. This then delivers the exact gram weight amounts needed for proper polymer cross linking and properties. After the materials are at the proper mix ratio they are then transported to the dynamic mixing head. The two components are mixed with mixing rotor speeds of 2000–2500 RPM.

Once all the reactants have been added together and the polymerization reaction has been initiated the polyurethane may be shaped according to any of the conventional techniques including injection moldings, spin casting, flow coating, compression molding and mold casting, etc. The polyurethane elastomer may be cured at elevated temperature from about 200° to 250° F. for approximately 1 to 2 hours, followed by a postcure at the same temperature for about 16 hours and a preconditioning at room temperature for about 2 weeks. The final products such as rolls and belts are bubble and foreign particle free and have the described mechanical and electrical properties.

While the above described process is one in which a prepolymer of the polylol and isocyanate is separately prepared and a mixture of the chain extenders, cross linkers and additives are separately processed under certain conditions and are separately added to a vacuum reactor mixer, it will be understood that the process may be carried out in a single step as long as the processing of the chain extenders, cross linkers, and additives is separately carried out under described conditions.

The following specific examples illustrate more clearly the manufacture, according to the present invention, of electrically conductive polyurethane elastomers. In the Examples, all parts, percentages are by weight unless otherwise stated.

EXAMPLE I

A bias transfer roll was fabricated from a low molecular weight polytetramethylene ether glycol Terathane™ 650 as follows. A prepolymer was prepared by adding Terathane™ 650 to 4,4' diphenlymethane diisocyanate in amounts to provide 9.5% by weight excess NCO content. A liquid mixture of the cross linker, chain extender and conductive additive was made from 7.5 parts of butanediol, 2.5 parts of trimethylol propane and 3.4 parts of Cyastat LS per hundred parts of prepolymer. The butanediol is a liquid at room temperature, the trimethylol propane was heated to 70 to 80 degrees Centigrade before being poured into the room temperature butanediol. The Cyastat LS which is a powder at room temperature, was added into the butanediol trimethylol propane mixture. The mixture was melted in an oven at 70° C. to 80° C. until all the particles had melted. The ingredients were then mixed with a spatula for 1 to 2 minutes. If all the particles do not melt it may be desirable to subject the mixture to a degassing procedure of 0.5 millimeters of mercury to break up the hard to melt particles. Subsequently, the liquid mixture of the ionic conductive additive, cross linking agents and chain extenders was filtered through a 280 to 400 mesh filter to remove any foreign particles. After mixing and filtering, the liquid mixture was again preheated in an oven at 70 to 80 degrees Centigrade and degassed to 0.5 millimeters of mercury for 20 minutes and it was kept under observation until all the bubbles observed by the naked eye were broken. Subsequently the heated degassed liquid mixture was added to one of the input ports of a Pyles mixer model no. 2601-677. The materials were formulated and prepared as previously described and then added to the Pyles vacuum mixer. The exact prepolymer pump RPM was 804 which yielded a prepolymer flow of 348 gms./min. The exact pump RPM of the mixture was 318 which yielded a flow of 48.5 gms./min. The mixing head speed was 2000 RPM. The above conditions yielded a mixed pot life of approximately 10 minutes. The mixed material was then fabricated into spin cast belts and molded rolls. The materials were cured at 230° F. for 2 hours and then post cured 16 hrs at 230° F. outside of the molds and spin casters. After a two week dwell the fabricated parts were tested for mechanical and electrical properties. The above process and formulation yielded bubble free belts and rolls that had electrical resistivities of $2.3\times 10^{10}$ ohm-cm. and hardnesses of 87–89 Shore A.

Two rolls made according to the above process were tested and determined to be bubble and foreign particle free and have acceptable mechanical and electrical properties.

EXAMPLE II

Belts were fabricated by preparing the prepolymer and the mixture of extenders, cross linkers and additives as in Example I and the two mixtures were mixed by hand in the same ratios as in Example I. They were then processed in a spin caster which was heated to 230° F. and spun at a speed sufficiently high enough to remove bubbles. After 2 hours at 230° F. the cured elastomer sheet was removed from the spin caster. The sheet was further subjected to a 230° F. for 16 hours post cure followed by a two week room temperature dwell. The belts were bubble free and free of foreign particles and had acceptable mechanical and electrical properties.

Thus, according to the present invention a method for making an electrically conductive polyurethane elastomer that is substantially free of bubbles and foreign particles is provided. By eliminating the particles, more uniform resistivity is achieved across a bias transfer roll and more uniform mechanical properties are achieved in a bias transfer roll resulting in a reduction in copy quality defects. The removal of the bubbles from such a polyurethane, not only insures more uniform electrical properties but also improves the adhesive qualities of the polyurethane resulting in improved bonding to the core. In addition, and with particular regard to other uses of the electrically conductive polyurethane elastomer such as in intermediate transfer members or transport belts, more uniform semiconductive belt properties are achieved.

The patents and copending patent application referred to herein are hereby specifically, totally and completely incorporated herein by reference.

While the present invention has been described with reference to specific embodiments described herein it will be apparent that many alternatives, modifications and variations may be made by those skilled in the art. Accordingly, it is intended to embrace all such alternatives and modifications as may fall within the spirit and scope of the appended claims.

What is claimed is:

1. A method of making an electrically conductive polyurethane elastomer that is substantially free of bubbles and foreign particles comprising:

forming a prepolymer mixture comprised of a polyol and an isocyanate;

separately forming a liquid mixture comprised of an ionic conductive additive, at least one cross linking agent, and at least one chain extender;

filtering said liquid mixture of additive, crosslinking agents and chain extenders to remove foreign particles;

preheating said liquid mixture to a temperature below the decomposition temperature and above the melting temperature of the additive, cross linking agents and chain extenders in a degassing oven to degass to less than 5 mm of mercury to break any bubbles in the mixture and to remove moisture to form a preheated degassed liquid mixture;

adding the prepolymer mixture, and the preheated degassed liquid mixture to a vacuum mixer and thereafter mixing under vacuum of less than 5 mm of mercury for a period of time sufficient to provide a uniform mixture;

removing the uniform mixture from the mixer and forming the uniform mixture into a desired shape; and curing the formed shape to an elastomer substantially free of bubbles and foreign particles.

2. The method of claim 1 further comprising preheating the prepolymer mixture and degassing to less than 5 mm of mercury prior to adding the prepolymer mixture to the vacuum mixer.

3. The method of claim 1 wherein said vacuum is from about 0.5 to about 1.3 mm of mercury.

4. The method of claim 1 wherein preheating the liquid mixture is at from about 70° to about 80° C.

5. The method of claim 1 wherein the ionic conductive additive is a quaternary ammonium salt present in an amount to provide a D.C. volume resistivity of from about $10^7$ to about $10^{11}$ ohms cm.

6. The method of claim 5 wherein said quaternary ammonium salt is present in an amount of from about 0.5 to about 8 parts by weight of the total composition.

7. The method of claim 1 wherein said ionic conductive additive is selected from the group consisting of tetraheptyl ammonium bromide, trimethyl octadecyl ammonium chloride, benzyl trimethyl ammonium chloride, asymmetric ionic quaternary ammonium salts having the formula:

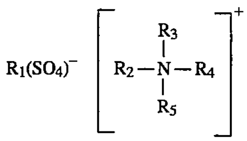

where $R_1$, $R_2$, $R_3$, $R_4$ and $R_5$ are $C_n H_{2n+1}$ and $1<n<25$, and asymmetric ionic quaternary ammonium salts having the formula:

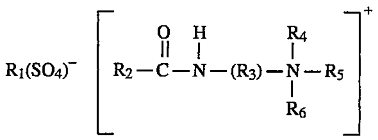

where $R_1$, $R_2$, $R_3$, $R_4$, $R_5$ and $R_6$ are $C_n H_{2n+1}$ and $1<n<25$, and wherein the additive is present in an amount sufficient to provide a D.C. volume resistivity of from about $10^7$ to about $10^{11}$ ohm cm.

8. The method of claim 7 wherein said ionic conductive additive is selected from the group consisting of tetraheptyl ammonium bromide, hexadecyl ethyl dimethyl ammonium ethyl sulfate; 1-octadecanammonium, N,N,N-trimethyl-, methylsulfate; 1-dodecanammonium, N,N,N-trimethyl-, methyl sulfate; 1-heptadecanammonium, N,N,N, trimethyl-, methyl sulfate; 1-tetradecanammonium. N,N,N-trimethyl-, methyl sulfate; 1-decanammonium, N,N,N-trimethyl-, methyl sulfate; and (3-lauramidopropyl) trimethyl ammonium methyl sulfate.

9. The method of claim 8 wherein said ionic conductive additive is tetraheptyl ammonium bromide.

10. The method of claim 8 wherein said ionic conductive additive is hexadecyl ethyl dimethyl ammonium ethyl sulfate.

11. The method of claim 8 wherein said ionic conductive additive is (3-lauramidopropyl) trimethyl ammonium methyl sulfate.

12. The method of claim 1 wherein said polyol is a polytetramethylene ether glycol having from about 8 to about 41 repeated tetramethylene ether units and said isocyanate is a diisocyanate present in an amount of from about 20 to 95 parts by weigh t per 100 parts by weight of said glycol.

13. The method of claim 12 wherein said diisocyanate is selected from the group consisting of methylene diisocyanates, diphenylmethane diisocyanates, toluene diisocyanates, naphthalene diisocyanates and blends thereof.

14. The method of claim 13 wherein said chain extender and cross linking agent comprise a mixture of from about 90 to about 60 percent by weight of a diol having the formula $HO(R_7)\,OH$ where $R_7$ is a straight or branched chain alkyl group having from 2 to 12 carbon atoms and from about 10 to about 40 percent by weight of a triol having the formula: $R'—C—\{(OH)_a(CH_2OH)_b\}$where R' is H, $CH_3$ or $C_2H_5$, a is 0 or 1, b is 2 or 3, and a+b=3.

15. The method of claim 12 wherein the total weight of cross linking agent and extender components is from about 4 to about 18 parts per 100 parts of polytetramethylene ether glycol.

16. The method of claim 15 wherein said extender and cross linking agent are a mixture of about 75 percent by weight of 1,4 butanediol and 25 percent by weight trimethylolpropane. respectively.

17. The method of claim 16 wherein said extender and cross linking agents are a mixture of about 60 percent by weight of 1,4 butanediol and 40 percent by weight trimethylolpropane. respectively.

18. The method of claim 12 wherein x is from 39 to 41.

19. The method of claim 12 wherein said diisocyanate is present in an amount from about 22 to 26 parts by weight per 100 parts by weight of said glycol.

20. A method of making an electrically conductive polyurethane elastomer that is substantially free of bubbles and foreign particles comprising:

forming a prepolymer mixture comprised of a polyol and an isocyanate;

forming a liquid mixture comprised of an ionic conductive additive, at least one crosslinking agent and at least one chain extender;

filtering the liquid mixture of additive, crosslinking agents and chain extenders to remove foreign particles;

prehearing the liquid mixture to a temperature below the decomposition temperature and above the melting temperature of the additive, crosslinking agents and chain extenders in a degassing oven to degass to less than 5 mm of mercury to break any bubbles in the mixture and to remove moisture to from a preheated degassed liquid mixture;

mixing the prepolymer and the preheated degassed liquid to provide a crosslinked elastomer;

forming the resulting elastomer into a desired shape; and curing the formed shape to a solid elastomer form substantially free of bubbles and foreign particles.

* * * * *